United States Patent [19]

Castelli et al.

[11] Patent Number: 4,652,211
[45] Date of Patent: Mar. 24, 1987

[54] HELICOPTER ROTOR

[75] Inventors: Pierluigi Castelli, Busto Arsizio; Vittorio Caramaschi, Gallarate, both of Italy

[73] Assignee: Costruzioni Aeronautiche Giovanni Agusta S.p.A., Cascina Costa Di Samarate, Italy

[21] Appl. No.: 830,543

[22] Filed: Feb. 18, 1986

[30] Foreign Application Priority Data

Feb. 19, 1985 [IT] Italy .............................. 67167 A/85

[51] Int. Cl.[4] .......................................... B64C 27/38
[52] U.S. Cl. .................................... 416/140; 416/107
[58] Field of Search ............... 416/140 A, 140 R, 106, 416/107

[56] References Cited

U.S. PATENT DOCUMENTS

| 4,342,540 | 8/1982 | Lovera et al. | 416/140 A |
| 4,361,415 | 11/1982 | Aubry | 416/134 A |
| 4,369,019 | 1/1983 | Lovera et al. | 416/134 A |
| 4,504,193 | 3/1985 | Mouille | 416/140 A |
| 4,512,717 | 4/1985 | Pancotti et al. | 416/134 A |
| 4,516,909 | 5/1985 | Caramaschi et al. | 416/134 A |
| 4,540,340 | 9/1985 | Pariani | 416/140 A X |
| 4,549,851 | 10/1985 | Pariani | 416/140 A |
| 4,549,852 | 10/1985 | Hibyan | 416/140 A |
| 4,551,067 | 11/1985 | Caramaschi et al. | 416/140 A |

Primary Examiner—Everette A. Powell

[57] ABSTRACT

Helicopter rotor on which each blade is connected in articulated manner to a center hub by means of a fork the vertical plane movement of which, at rotor speeds below a given set value, is limited by a pair of limit rocker arms located between the hub and a ring nut mounted in rotary manner on the fork
and rendered angularly integral with the hub by means of a compass drive.

9 Claims, 9 Drawing Figures

HELICOPTER ROTOR

BACKGROUND OF THE INVENTION

The present invention relates to a helicopter rotor. In particular, the present invention relates to an articulated rotor on which each blade is connected to a center hub on the rotor by means of a fork, in turn, connected in articulated manner to a center hub on the said rotor.

On articulated rotors of the aforementioned type, each blade oscillates, in relation to the hub and about the said articulated joint, both vertically, due to lift and in a plane perpendicular to the hub plane, and horizontally in the hub plane, due to inertia and drag. Known rotors of the aforementioned type are generally provided with limiting devices for maintaining vertical and horizontal oscillation angles within a relatively limited range, when the speed of the rotor is below a given set value.

In more detail, limiting devices are known to be employed comprising rocker arms mounted on the said fork or hub and designed to move, due to centrifugal force, between a normal idle position, wherein the said rocker arms are designed to cooperate with contact surfaces on the said hub or, respectively, on the said fork, for limiting the said oscillation, and an operating position wherein the blade is free to oscillate.

The main drawback on articulated rotors with limiting devices of the aforementioned type is that, in addition to the said vertical and horizontal oscillation, the said articulated joint connecting the fork and hub also allows the blade to turn and change pitch about its own axis. As such pitch-change rotation obviously results in displacement of the said contact surfaces and the paths of the respective rocker arms, contact between the said rocker arms and respective contact surfaces is impaired, thus resulting in rapid wear and reduced efficiency of the said limiting devices.

This is extremely dangerous, especially as regards vertical oscillation control, in that, whereas horizontal oscillation is kept under control at all times by means of hydraulic dampers between the blade and hub, low-speed vertical oscillation is generally limited solely by the said rocker arms, any inefficiency of which may result, especially during take-off and due to both wind and "ground effect", in a sharp upward sweep of the blades and consequent overturning of the helicopter.

SUMMARY OF THE INVENTION

The aim of the present invention is to provide a rotor, the structure of which is such as to guarantee, at least as regards the said vertical oscillation limiting device, perfect contact at all times between the said rocker arms and respective contact surfaces, regardless of the blade pitch involved.

With this aim in view, according to the present invention, there is provided an articulated helicopter rotor comprising a drive shaft, a center hub fitted onto the said drive shaft, a number of blades extending substantially radially from and connected in articulated manner to the said hub, and a device for limiting oscillation of each blade in relation to the said hub in a direction substantially parallel with the axis of the said drive shaft, characterised by the fact that, for each blade, the said limiting device comprises a ring nut supported on the said blade in such a manner as to turn about its own axis parallel with the axis of the said blade, compass means extending between the said ring nut and the said hub for rendering the same angularly integral as regards rotation about the axis of the said ring nut, and rocker arm means located between the said hub and the said ring nut and turning in a plane substantially parallel with the axis of the said drive shaft.

BRIEF DESCRIPTION OF THE DRAWINGS

A number of non-limiting arrangements of the present invention will now be described with reference to the accompanying drawings, in which.

DETAILED DESCRIPTION OF THE INVENTION

Figure 1:
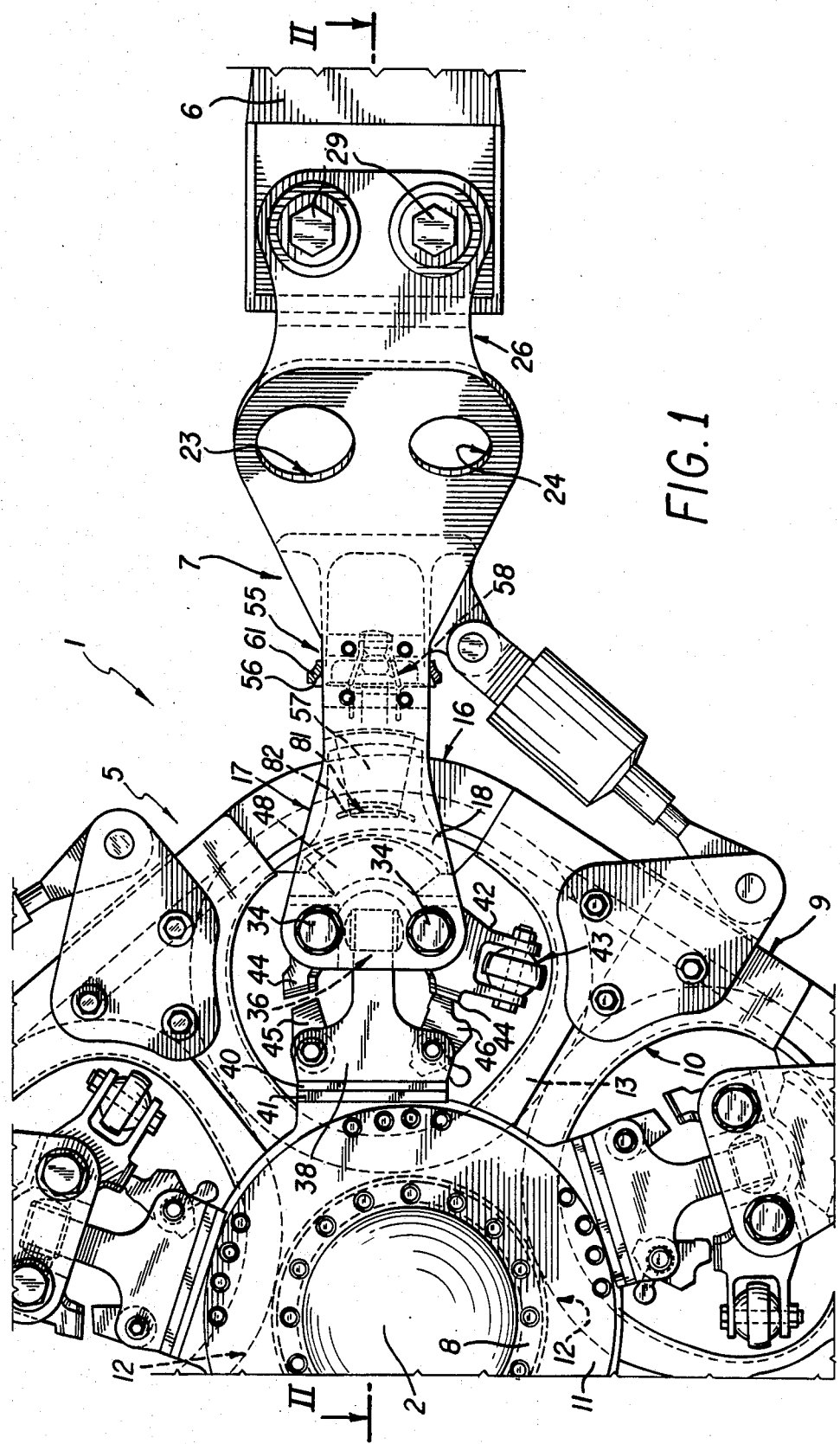
FIG. 1 shows a partial plan view, with parts removed for clarity, of a preferred arrangement of the rotor in accordance with the present invention.
Figure 2:
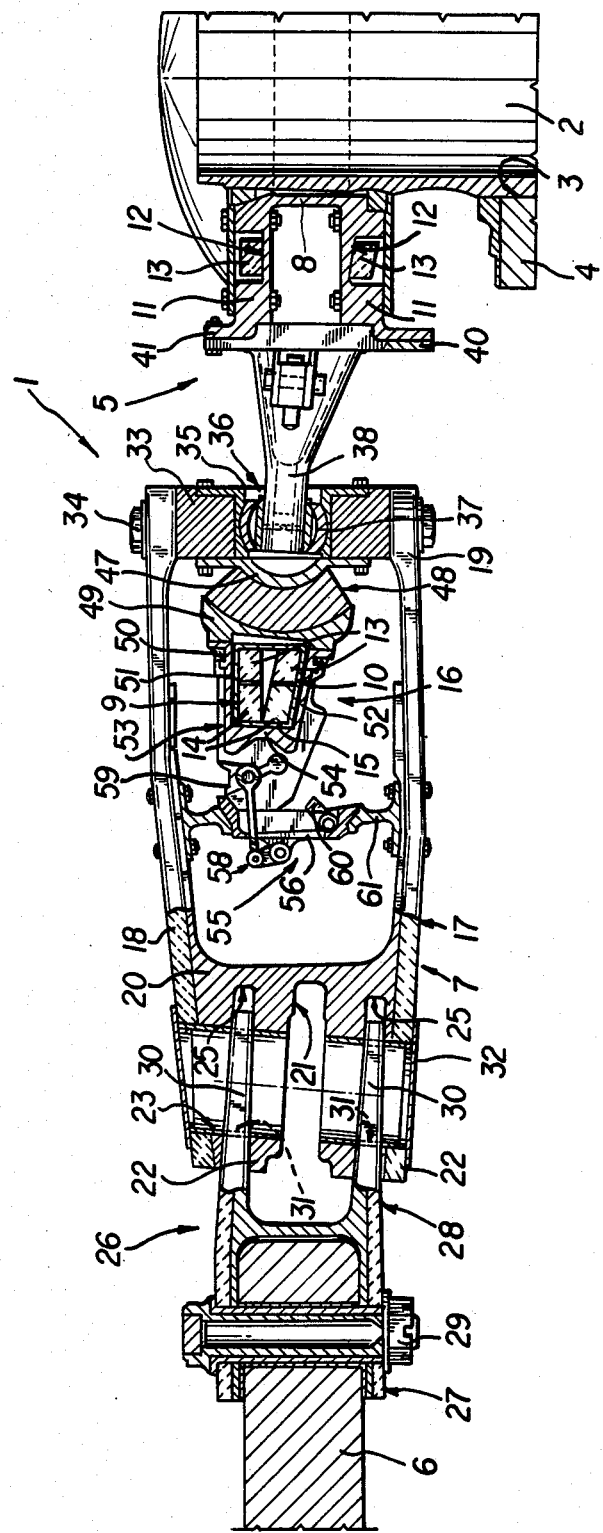
FIG. 2 shows a section along line II—II in FIG. 1.
Figure 3:
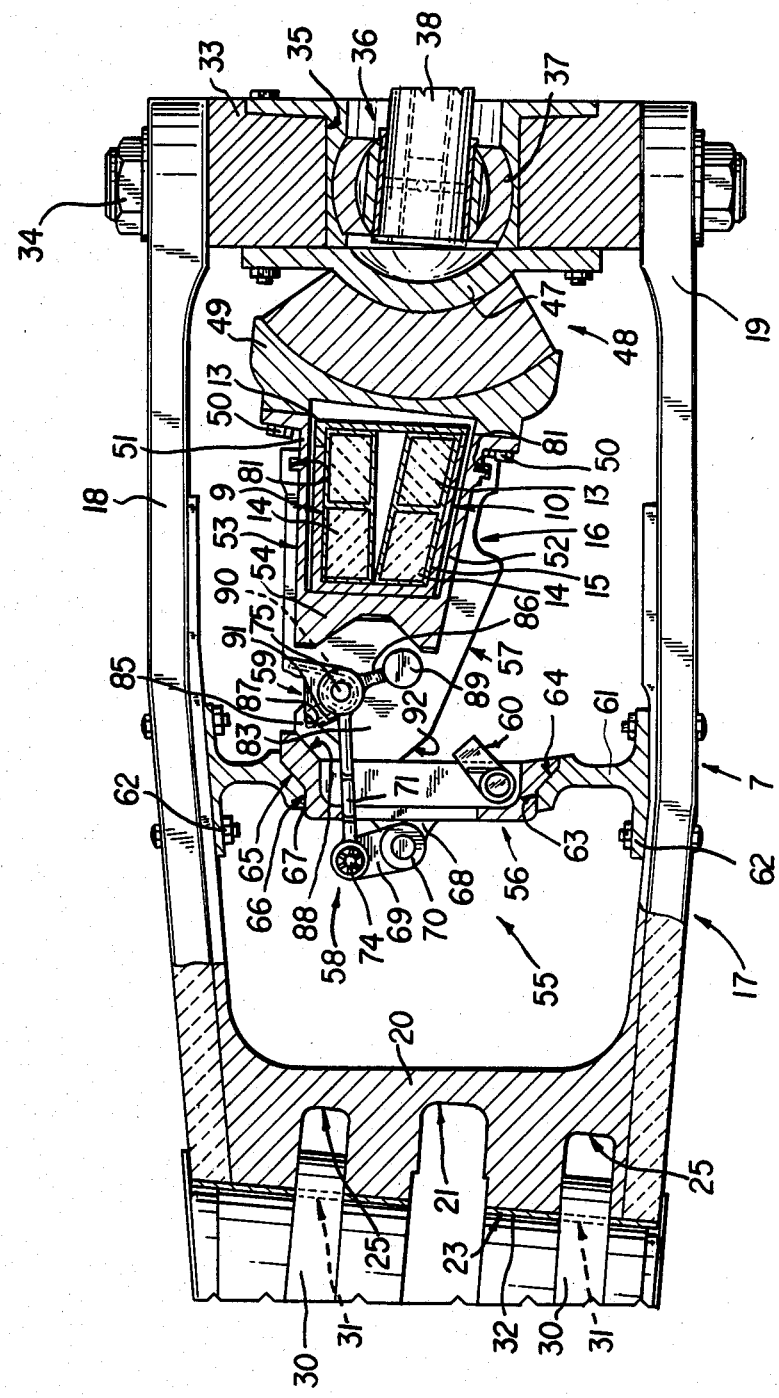
FIG. 3 shows an enlargement of a detail in FIG. 2.

FIGS. 1 and 2 show a main helicopter rotor 1 comprising a substantially vertical drive shaft 2 the top end of which comes out externally through a hole 3 (FIG. 2) formed in fuselage 4 of the helicopter.

Rotor 1 also comprises a hub 5 fitted onto the said top end of and coaxial with shaft 1, and a number of blades 6 (only one of which is shown) extending substantially radially outwards from hub 5 and each connected to hub 5 by means of a respective connecting device 7.

Hub 5 comprises a tubular inner body 8 preferably made of metal and fitted onto shaft 2; an outer frame 9 preferably made of composite material and presenting a horizontal section substantially in the form of a regular polygon with rounded tips equal in number to blades 6; and a number of annular blending elements 10 each located between tubular body 8 and a respective rounded tip on frame 9.

As shown in FIG. 2, the top and bottom ends of tubular body 8 present two annular flanges 11, each of which is furrowed by a number of grooves 12 curving outwards and equal in number to blades 6, each of the said grooves 12 housing a portion of a substantially rectangular-section strap 13 made of composite material and presenting a substantially circular horizontal section.

Each circular strap 13 on top flange 11 is arranged facing a similar strap 13 on bottom flange 11, and the straps in each pair of facing straps 13 are rendered integral with each other, in such a manner as to define a respective annular element 10, as well as with adjacent annular elements 10 and frame 9. The said frame 9 also consists of two straps 14 arranged one on top of the other and rendered integral with straps 13 of each annular element 10 by means of a composite material jacket 15, in such a maner as to define, at each rounded tip of frame 9, a bridge structure 16 connected to connecting device 7 on respective blade 6.

Each connecting device 7 comprises a substantially U-shaped fork 17 mounted with its concave side facing shaft 2. Fork 17 comprises a top arm 18 and a bottom arm 19 rendered integral at their respective outer ends by a root element 20, which, on its outward-facing side, presents a substantially horizontal cutout 21 defining, on element 20 itself, two arms 22 arranged one over the other and facing radially outwards in relation to shaft 2.

Arms 22 each present two through axial holes, 23 and 24, and a cutout 25 substantially parallel with cutout 21. Each connecting device 7 also comprises an adapting element 26 consisting of two opposed forks, 27 and 28, the first housing the root of a respective blade 6 secured to the arms of fork 27 by means of two through bolts 29, and the second comprising two arms 30 arranged one over the other and each engaged in rotary and sliding manner inside a respective cutout 25, and each presenting a hole 31 coaxial with hole 23.

Coaxial holes 23 and 31 are fitted through with a pin 32, whereas hole 24 houses a motor (not shown) cooperating in known manner with a drive (not shown) for turning respective blade 6 about the axis of hole 24, after first removing pin 32 housed inside holes 23 and 31. Adapting element 26 and the said motor (not shown) provide, in known manner, for bending respective blade 6 along fuselage 4 and so enabling easy stowage of the helicopter in confined spaces, e.g. inside a ship.

Each connecting device 7 is connected to respective bridge structure 16 by means of a wall 33 extending through the centre opening of respective annular element 10 and connected to the free inner ends of respective arms 18 and 19 by means of two through bolts 34.

Wall 33 presents a center hole 35 extending substantially radially in relation to shaft 2 and housing a ball joint 36, the ball 37 of which is mounted on the free end of an appendix 38.

On the end opposite the one fitted with ball 37, appendix 38 presents a flange 40 for connecting appendix 38 to a flange 41 located in a plane substantially parallel with the axis of shaft 2 and integral with the outer edge of flanges 11.

As shown in FIG. 1, wall 33 is provided with a lateral fork 42 connecting the end of a drive 43 controlling the pitch change of respective blade 6, and presents, on the side facing shaft 2, two appendices 44 designed to cooperate, in known manner, with the ends of respective rocker arms 45 and 46 supported on appendix 38 and constituting, together with appendices 44, a device for limiting movement of respective blade 6 in relation to hub 5 in a substantially horizontal plane perpendicular to the axis of shaft 2.

The surface of wall 33 facing respective root element 20 is connected to the inner shoe 47 of a spherical elastomer bearing 48, the outer shoe 49 of which is arranged substantially contacting respective bridge structure 16, and is connected on its top and bottom ends, by means of screws 50, to the free ends of two arms, 51 and 52, on a U-shaped bracket 53 fitted onto the said bridge structure 16 with its concave side facing shaft 2 and its root element 54, by which arms 51 and 52 are joined, contacting the outer surface of bridge structure 16.

Between each bracket 53 and fork 17 on respective connecting device 7, a device 55 is inserted for limiting oscillation of blade 6 in relation to hub 5 in a substantially vertical plane parallel with the axis of shaft 2.

As shown, particularly in Fig.s 3 and 4, limiting device 55 comprises a ring nut 56 with its axis substantially parallel with that of respective blade 6 and mounted on fork 17 so as to turn about its own axis and in angularly fixed manner in relation to hub 5; a slide 57 mounted so as to slide along respective bridge structure 16 by virtue of a compass drive 58 extending between slide 57 and ring nut 56; and two rocker arms, 59 and 60, designed to turn in a plane substantially parallel with the axis of shaft 2, and located between slide 57 and ring nut 56 for limiting downward and upward displacement respectively of ring nut 56 in relation to slide 57, when the speed of rotor 1 is below a given preset value. In more detail, between the two arms, 18 and 19, of each fork 17, there extends a crosswise wall 61 having connecting flanges 62, on its opposite ends, for its own connection to arms 18 and 19. Wall 61 is located in a plane substantially perpendicular to the axis of respective appendix 38, and presents a center through hole 63 the surface of which defines a tapered annular seat 64 flaring towards shaft 2. Seat 64 constitutes a supporting and sliding seat for ring nut 56 the outer surface of which comprises a truncated-cone portion 65 contacting seat 64, and a cylindrical portion 66 extending from the smaller end of portion 65 in the direction of respective blade 6 and through hole 63.

Ring nut 56 is secured axially inside hole 63 by means of a retaining ring 67, and is provided, on the side facing blade 6, with a fork 68 for its own connection to one end of drive 58.

Figure 4:
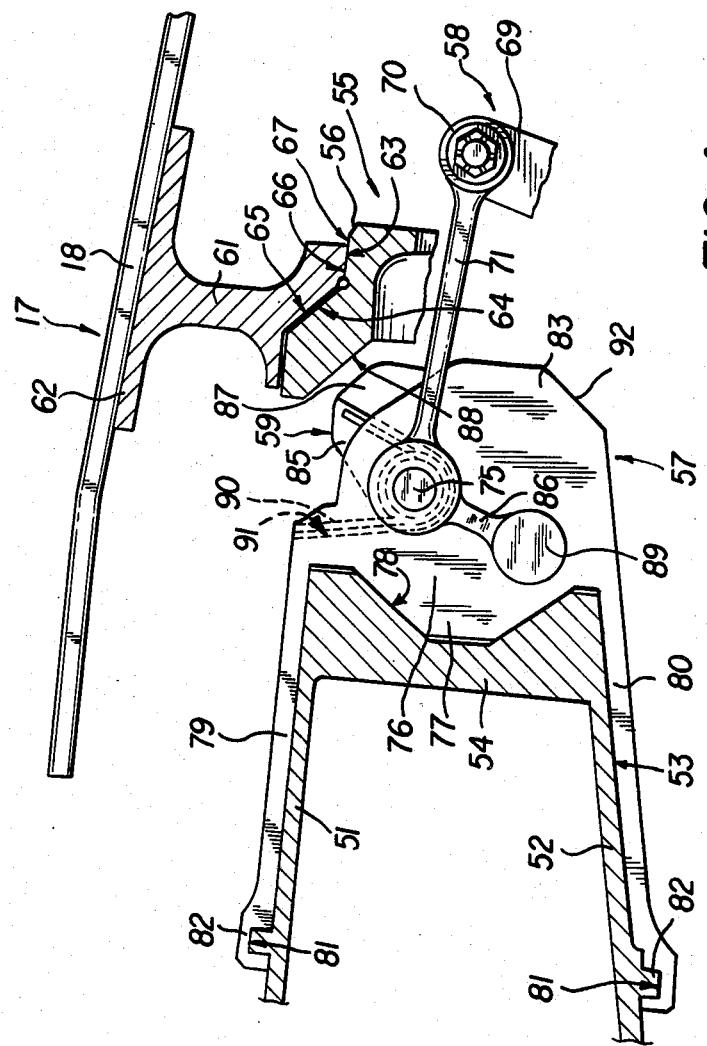
FIG. 4 shows an enlargement of a detail in FIGS. 2 and 3.
Figure 6:
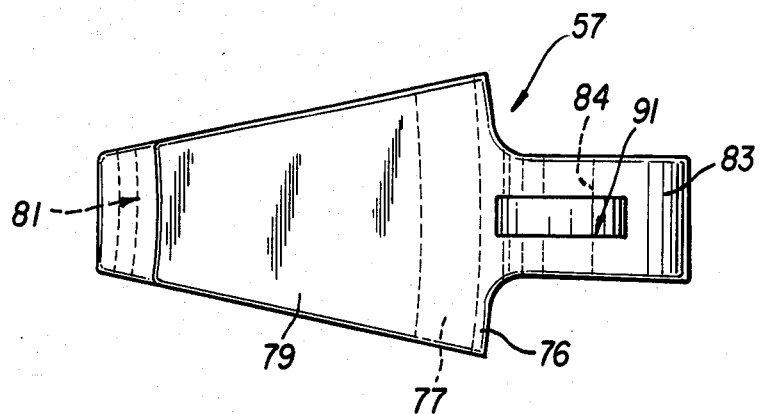
FIG. 6 shows an enlarged plan view of a detail in FIGS. 2 and 3.
Figure 5:
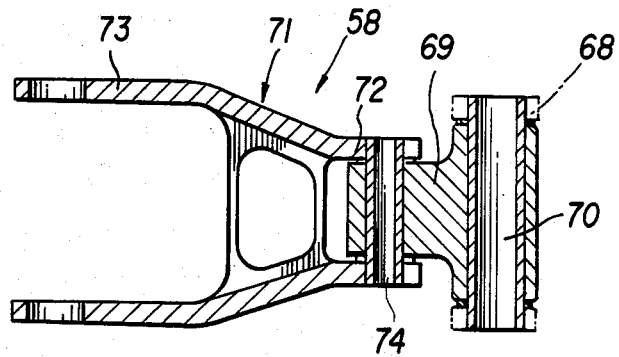
FIG. 5 shows a longitudinal section of a detail in FIG. 3.

As shown, particularly in FIG. 5, compass drive 58 lies in a plane substantially radial in relation to hub 5, and comprises a crank 69 the small end of which is inserted between the arms of fork 68 and hinged to the said arms by means of a through pin 70 perpendicular to the axis of ring nut 56. Drive 58 also comprises a connecting rod 71 consisting of two opposed forks, 72 and 73, the first receiving the big end of crank 69 and being hinged to the same by means of a through pin 74 parallel with pin 70, and the second enclosing slide 57 and being hinged to the same by means of a through pin 75 parallel with pin 74. As shown, particularly in FIGS. 4 and 6, slide 57 is substantially U-shaped and fitted in crosswise-sliding manner onto bracket 53. Slide 57 comprises an end plate 76 the inner surface of which defines a wedge 77 extending towards shaft 2 and engaged in sliding manner inside a groove 78 formed on the outer surface of element 54 on bracket 53 and extending in a plane substantially perpendicular to the axis of shaft 2. From the top and bottom ends respectively of plate 76, there extend, towards shaft 2, two arms, 79 and 80, presenting a trapezoidal plan and being tapered towards shaft 2. Close to its free end, each arm, 79 and 80, presents an inner groove 81 extending over an arc of a circle with its center on the axis of shaft 2, and engaged in sliding manner by a respective curved guide rib 82 extending in a plane substantially crosswise in relation to the axis of shaft 2, from the arm 51 or 52 of bracket 53 facing the said groove 81. As shown in FIG. 1, the arc over which extends each rib 82 is roughly twice the arc over which extends respective groove 81.

On the side facing respective blade 6, slide 57 presents a nose 83 with a through hole 84 engaged by pin 75 the opposite ends of which project from hole 84 and are fitted respectively with a first arm 85 and a second arm 86 of rocker arm 59. Arm 85 is located on top and comprises a head 87 designed to cooperate with a supporting surface 88 formed on ring nut 56 for supporting, when idle, respective blade 6 on hub 5, and to move towards shaft 2, releasing contact with surface 88, as a result of rocker arm 59 being rotated by a counterweight 89, connected to the end of bottom arm 86, when the speed of rotor 1 exceeds a given preset value. The said rocker arm 59 is rotated against the action exerted by a spring 90, a center portion of which is wound about pin 75, and the ends of which engage a slot 91 formed longitudinally along the top surface of nose 83 and communicating with hole 84. At the bottom, nose 83 presents a supporting surface 92 designed to cooperate with rocker arm 60 for limiting, when idle, upward movement of respective blade 6.

In actual use, the slightest movement of blade 6 in the hub 5 plane, i.e. crosswise in relation to the axis of shaft 2, is transmitted by fork 17 to slide 57 via drive 58, thus causing slide 57 to slide along respective bridge structure 16. Consequently, displacement of blade 6 in the hub 5 plane causes no relative displacement of ring nut 56 and slide 57.

Furthermore, the slightest rotation of blade 6, and consequently also of respective fork 17, about their respective axes, subsequent to a change in pitch of blade 6 imparted via drive 43, causes relative rotation of ring nut 56 and respective supporting wall 61; the said supporting wall 61 rotating in relation to ring nut 56, and the said ring nut 56 being kept angularly fixed in relaton to slide 57 by drive 58.

In other words, the only relative movement of each ring nut 56 and respective slide 57 is an oscillating movement in a plane perpendicular to the hub 5 plane and substantially through the axis of shaft 2. For rotor 1 speeds below a given preset value, such oscillating movement is limited by rocker arms 59 and 60 which, in the absence of any relative movement of ring nut 56 and slide 57, other than the said oscillating movement, are perfectly located, at all times, facing respective supporting surfaces 88 and 92.

In the variation shown in Fig.s 7, 8 and 9, ring nut 56 in the embodiment shown in Fig.s 1 to 6 is replaced by a ring nut 93 the outer surface of which is substantially identical to that of ring nut 56 and is indicated using the same numbering system. Like ring nut 56, ring nut 93 also mates in rotary and sliding manner with taper seat 64 formed on wall 61, and presents, on the side facing hub 5, a bottom fork 94 to which rocker arm 60 is connected in rotary manner by means of pin 95 and spring 96. Unlike ring nut 56, ring nut 93 presents a substantially radial appendix 97 extending towards hub 5, over supporting surface 88. Appendix 97 presents a crosswise through hole 98 and engages an end fork 99 on a crank 100 hinged to appendix 97 by means of a pin 101 extending through hole 98.

Crank 100 forms part of a compass drive 102 also comprising a connecting rod 103 one end of which consists of a fork 104 connected to connecting rod 103 by a pin 105 engaged in a hole 106 formed through crank 100. As shown in Fig.s 7 and 8, connecting rod 103 consists substantially of a substantially trapezoidal, flat plate 107 from the opposite ends of the longer side of which extend the arms of fork 104, and to the shorter side of which, facing hub 5, slide 108 is connected integral; the said slide 108 being mounted in sliding manner on a rail 109 supported on hub 5 and extending in a plane substantially crosswise in relation to the axis of shaft 2. Slide 108 consists of two arms 110 arranged one over the other and extending from the shorter side of plate 107 towards shaft 2. The said two arms 110 define a substantially rectangular-section passage 111 engaged in sliding manner by rail 109. The said rail 109 comprises a rod 112 having a curved longitudinal axis with its centre substantially located on the axis of shaft 2. Rod 112 presents a rectangular section of such size as to enable rod 112 to engage, in sliding manner, passage 111 on slide 108, but not to turn inside the same.

Rod 112 is provided, on its opposite ends, with two cylindrical pins 113 coaxial with each other and each engaging in rotary manner, with a frictionfree bushing 114 inbetween, a hole 115 on a respective bracket 116 connected integral with the top surface of arm 51 on bracket 53.

Figure 9:
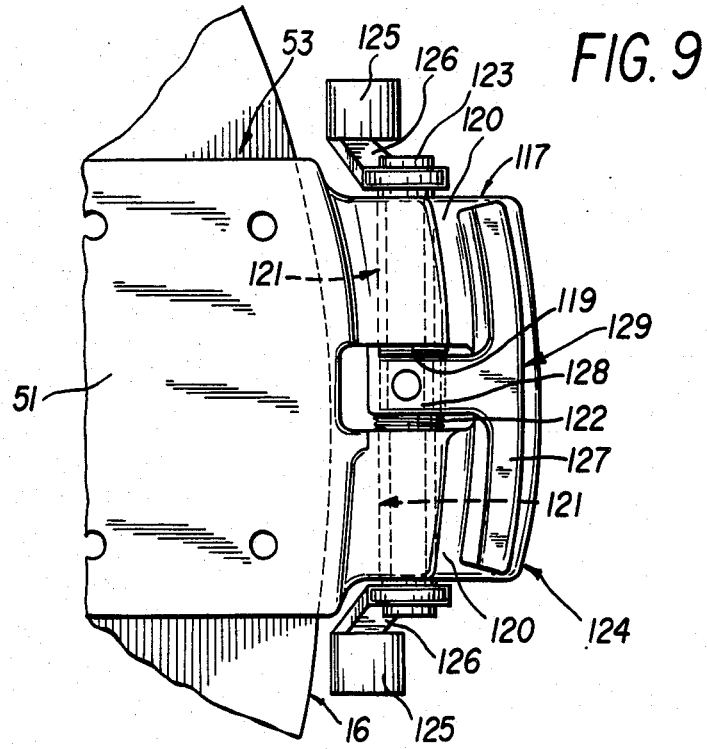
FIG. 9 shows a plan view of a second detail on the FIG. 7 variation.
Figure 7:
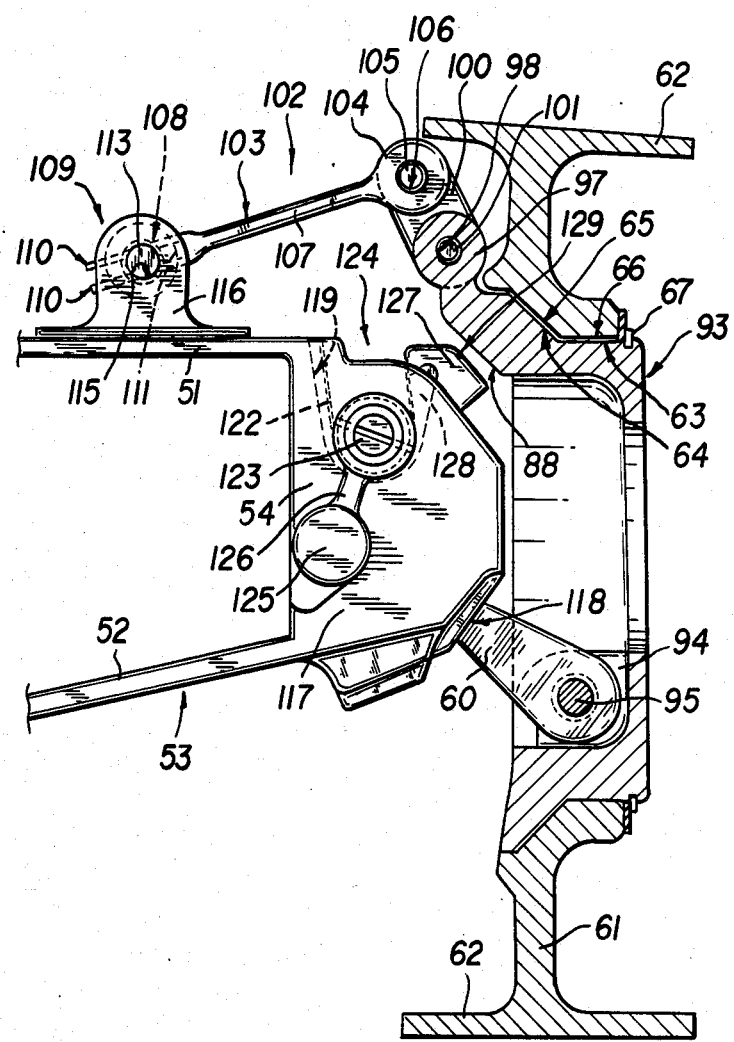
FIG. 7 shows a section of a variation of the FIG. 4 detail.
Figure 8:
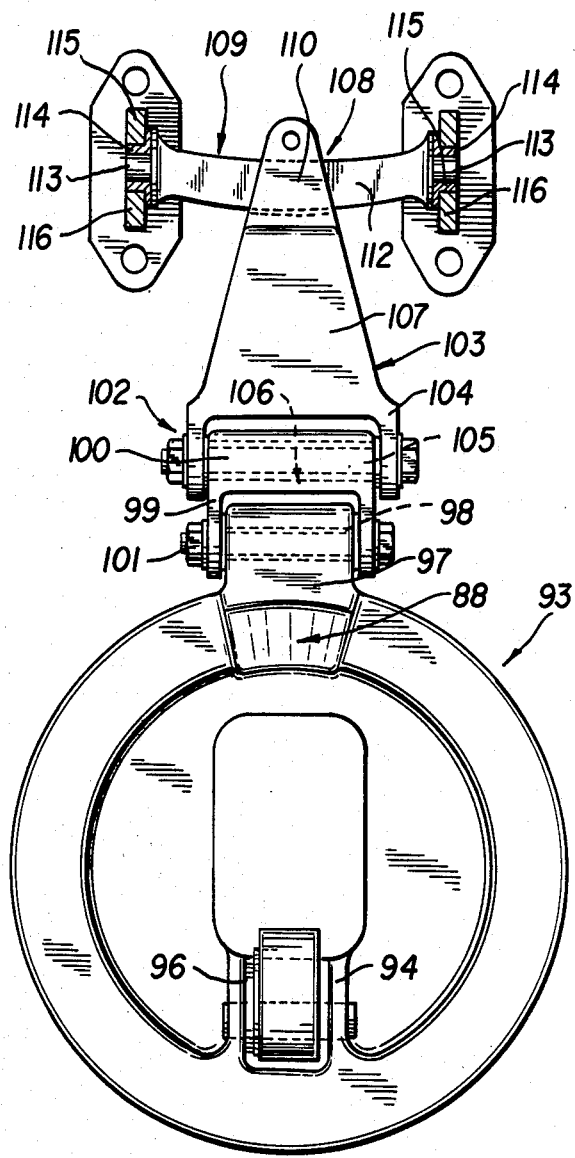
FIG. 8 shows a plan development of a first detail on the FIG. 7 variation.

Unlike the embodiment described with reference to FIGS. 1 to 6, the variation shown in FIGS. 7 to 9 has no slide 57 and, as shown, particularly in FIG. 9, bracket 53 presents an appendix 117 extending from its own root element 54 towards respective blade 6 and having a curved bottom surface constituting a supporting surface 118 (FIG. 7) for rocker arm 60.

By means of a cutout 119 parallel with the axis of shaft 2, appendix 117 is divided into two arms 120 having crosswise through holes 121 coaxial with each other and engaged in rotary manner, against the action of return spring 122, by the opposite ends of pin 123.

Pin 123 constitutes the fulcrum of a rocker arm 124 corresponding to rocker arm 59 in FIGS. 1 to 6 and comprising two counterweights 125 connected integral, by means of respective arms 126, to the opposite ends of pin 123 projecting from holes 121. Rocker arm 124 also comprises a head 127 connected to pin 123 by a centre arm 128, extending through cutout 119, and having a curved surface 129 substantially coaxial with shaft 2 and designed to cooperate with supporting surface 88.

Both surfaces 129 and 118 extend over arcs substantially similar to the arc of rod 112, and greater than the arcs over which extend surface 88 and the end of rocker arm 60. Operation of the variation shown in FIGS. 7 to 9 is as already described with reference to FIGS. 1 to 6, the only difference being that the variation shown in FIGS. 7 to 9 has no slide 57. Consequently, between surfaces 88 and 118 and respective rocker arms 124 and 60, relative movement may occur in a plane perpendicular to the axis of shaft 2, such movement being due to inertia and drag and being compensated by the size, parallel to the said plane, of surfaces 129 and 118.

We claim:

1. An articulated helicopter rotor comprising a drive shaft (2), a center hub (5) fitted onto the said drive shaft (2), a number of blades (6) extending substantially radially from and connected in articulated manner to the said hub (5), and a device (55) for limiting oscillation of each blade (6) in relation to the said hub (5) in a direction substantially parallel with the axis of the said drive shaft (2), characterised by the fact that, for each blade (6), the said limiting device (55) comprises a ring nut (56) (93) supported on the said blade (6) in such a manner as to turn about its own axis parallel with the axis of the said blade (6), compass means (58)(102) extending between the said ring nut (56) (93) and the said hub (5) for rendering the same angularly integral as regards rotation about the axis of the said ring nut, and rocker arm means located between the said hub and the said ring nut (56) (93) and turning in a plane substantially parallel with the axis of the said drive shaft (2).

2. A rotor as claimed in claim 1, characterised by the fact that each said blade (6) is connected to the said center hub (5) by means of a fork (17) comprising two arms (18, 19) located one over and the other below the said center hub (5); the said ring nut (56)(93) being located between and supported by the said two arms (18, 19).

3. A rotor as claimed in claim 2, characterised by the fact that each said fork (17) comprises a wall (61) extending between the said two arms (18, 19) and crosswise in relation to the axis of the respective said blade (6); the said cross wall (61) having a tapered center seat (64) facing the said hub (5), and the said ring nut (56)(93) having a tapered annular surface (65) locked axially contacting the said tapered seat (64) and cooperating in rotary manner with the same.

4. A rotor as claimed in claim 1, characterised by the fact that, for each said blade (6), it also comprises a guide (82)(109) carried on the said hub (5) and extending in a plane substantially crosswise in relation to the axis of the said drive shaft (2), and a slide (57)(108) connected in sliding manner to the said guide (82)(109) and connected to the said compass means (58)(102).

5. A rotor as claimed in claim 4, characterised by the fact that each said slide (57) is substantially U-shaped and comprises a top arm (79) and a bottom arm (80) connected in crosswise-sliding manner to the said hub (5) and extending in such a manner as to enclose a respective peripheral portion (16) of the same.

6. A rotor as claimed in claim 5, characterised by the fact that each said guide (82) comprises two curved ribs carried on the said hub (5) and engaged in sliding manner inside respective curved grooves (8) formed on the arms (79, 80) of the respective said slide (57).

7. A rotor as claimed in claim 4, characterised by the fact that the said rocker arm means comprise at least one rocker arm (59) supported in rotary manner on the said slide (57); the said ring nut (56) having a contact surface (88) for one end of the said rocker arm (59), and the said slide (57) being connected to the said compass means (58) by means of a hinge (73, 75) having its axis substantially parallel with the said guide (82).

8. A rotor as claimed in claim 4, characterised by the fact that the said rocker arm means comprise at lease one rocker arm (124) supported in rotary manner on the said hub (5); the said ring nut (93) having a contact surface (88) for an end surface (129) on the said rocker arm (124), and the said slide (108) being integral with one end of the said compass means (102).

9. A rotor as claimed in claim 8, characterised by the fact that the said slide (108) comprises two arms (110) extending from the said end of the said compass means (102) and defining a passage (111) through which the said guide (109) is mounted in prismatically-sliding manner; the said guide (109) comprising a curved rod (112) connected at opposite ends and in rotary manner to the said hub (5).

* * * * *